United States Patent Office 2,918,411
Patented Dec. 22, 1959

2,918,411

PHARMACEUTICAL PREPARATIONS

John A. Hill, New Brunswick, N.J., assignor to Olin Mathieson Chemical Corporation, New York, N.Y., a corporation of Virginia No Drawing. Application November 1, 1957
Serial No. 693,795

7 Claims. (Cl. 167—82)

This invention relates to novel compositions of matter; more particularly it relates to, and has for its object the provision of, improved pharmaceutical preparations providing for the release of pharmacologically active materials over a controlled extended period of time and, methods for producing such preparations.

It has now been found that pharmaceutical oral dosage forms may be prepared in such a way as to enable the pharmacologically active material contained therein to be released on ingestion at a predetermined retarded rate, thus prolonging the pharmacological activity, and, at the same time, making it possible to accurately control the level of pharmacologically active material in the system so as to provide the desired effect.

While the administration of water-soluble pharmacologically active agents is especially enhanced by the use of this invention, it is also useful in the administration, per os, of substantially water-insoluble pharmacologically active agents.

By the use of this invention, pharmacologically active materials (e.g. therapeutic agents or combinations thereof) can be administered orally with a continuous release effected over an extended period of time through the use of a multiplicity of small pellets consisting essentially of the pharmacologically active material and a material slowly digestible or dispersible in the gastro-intestinal tract.

Prior to this invention, pharmaceutical preparations have been made available which provide for the timed release of pharmacologically active materials over an extended period of time. These prior preparations, however, possess certain undesirable characteristics which the compositions of this invention have eliminated. For example, in prior preparations, the release of the pharmacologically active material is dependent entirely on the digestibility of the matrix or coating, at which point the complete release of the pharmacologically active ingredient is effected.

Another advantage of the preparations of this invention is their stability. Inasmuch as each pellet is relatively homogeneous in character, there is less tendency for it to rupture when exposed to varying temperatures than pellets or tablets prepared by heretofore known methods, e.g. by placing a coating around a core of different compositions.

Still another advantage of the preparations of this invention is the protection they provide against premature release of the pharmacologically active material. In conventionally coated pellets or tablets, the active material in the core is immediately or prematurely released and consequently absorbed once the coating is cracked or ruptured in any way. Conversely, in the event one of the pellets prepared by the methods of this invention is ruptured, there is no complete exposure of the active material; rather, the difference in release rate between the ruptured pellet and an unruptured pellet is roughly proportional to the increased surface area due to the smaller particle size of the ruptured pellet.

Another advantage of the invention is that it makes possible preparation of pellets from a single formulation that will produce almost immediate physiologic response and at the same time significantly extend the duration of activity of the pharmacologically active material. Heretofore, conventionally coated pellets have been dependent upon the admixture of several differently formulated coatings to achieve similar results.

Still another advantage of the invention is that the pellet formulations lend themselves well to recovery should there inadvertently be an error in compounding; all that is required is a remelting of the material, the addition of necessary corrective requisites and reprocessing.

The objects of this invention are accomplished by a series of steps which essentially comprises mixing together, with heating, at least the following essential components: (a) polyvinylpyrrolidone; (b) a substantially water-insoluble agent melting above 45° C. selected from the group consisting of saturated fatty acids, saturated fatty acid esters of mono, di and trihydric alcohols, saturated fatty alcohols, mono and poly ethers of saturated fatty alcohols, saturated aliphatic ketones, and pharmacologically acceptable sterols; and (c) a pharmacologically active material; and, pelletizing the mixture.

More particularly, the series of steps comprises mixing together, with heating, (a) and (b) until solution or a molten mass is effected, cooling the solution or mass until it congeals, granulating the congealed mass, reheating until a clear melt is obtained, cooling slightly, adding thereto (c), stirring until a substantially uniform molten mass results, allowing said mixture to cool almost to the set point and then pelletizing the composition. The pellets may then be encapsulated or embodied in any other dosage unit form; or administered directly from the bulk pellet form.

Alternatively, the preparations of this invention may be produced by mixing the granulated congealed mass of (a) and (b) with a previously heated water-insoluble wax possessing a melting point above 60° C., cooling slightly and then adding the pharmacologically active material.

Saturated fatty acids, saturated fatty acid esters of mono, di and trihydric alcohols, saturated fatty alcohols, ethers of saturated fatty alcohols, saturated aliphatic ketones and pharmacologically acceptable sterols utilizable include, inter alia: stearic acid, glyceryl monostearate, glyceryl tristearate, arachidic alcohol, cetyl alcohol, stearyl alcohol stearone and cholesterol. Water insoluble waxes utilizable include, inter alia: candelilla wax, beeswax, carnauba wax and castor wax. In some instances, depending upon the pharmacologically active material being used, the wax may be replaced by a non-ionic surfactant, e.g. Pluronic F-68. Pharmacologically active materials utilizable in the compositions of this invention include, inter alia: antibiotics and salts thereof (e.g. penicillin G); hypnotics (e.g. barbiturates and barbituric acid salts); tranquilizing agents (e.g. reserpine, rauwolfia alkaloids, phenothiazine derivatives); antihistamines (e.g. 2 - [p - chloro-α-(2-dimethylaminoethyl) benzyl]pyridine maleate (chlor-trimeton maleate); narcotics (e.g. codeine, narcotine, dihydrocodeinone, and their salts and ethyl-1-methyl-4-phenylpiperidine-4-carboxylate hydrochloride (demerol hydrochloride).

The pelletizing, or forming of a multiplicity of very small solid spheroidal particles having a non-fractured surface may be accomplished by any method suitable for preparing such particles; one which has been found to be highly satisfactory involves a process referred to as the "centrifugal" process.

In this process the melted mixture of the ingredients which make up the composition, in a liquid state at an elevated temperature, with the components substantially uniformly distributed throughout, is placed in or led into a rapidly rotating cone-shaped vessel with perforations interspaced around the bottom rim area of the cone. As the vessel rapidly rotates, the melted mixture will flow out of the perforations and will be thrown for a considerable distance through the air, e.g. about 4 to 12 feet, due to the centrifugal force. As the melted mixture passes through the perforations in the side of the vessel, it is broken up into a multiplicity of very small spheroidal particles. These particles, which are liquid when they leave the vessel, cool very rapidly as they pass through the air, and, by the time they fall to the floor of the chamber in which the rotating vessel is located, they will have substantially solidified. Under practically all conditions it will be found that these solid particles will be practically perfect spheres and will have a smooth or glossy non-fractured surface; the particles which are not true spheres will be so nearly so that they may properly be described as spheroidal in shape.

In this process, the melted mixture of ingredients is preferably at a temperature such that the mixture flows readily and will flow through the perforations of the rapidly rotating cone without tending to clog the perforations. The speed at which the cone is rotated may vary, of course, but it has been found that a rotation of from about 1000 to about 2000 revolutions per minute will give a very satisfactory product. The perforations in the cone are designed or adjusted so as to give solid spheroidal particles having a diameter such that the majority of the particles will pass through an 8 mesh screen but will not pass through a 200 mesh screen. Perforations in the cone having a diameter of from about 1/16 to about 1/32 of an inch will ordinarily give satisfactory products.

In nearly all cases, the spheroidal particles which are obtained will be free flowing and will not tend to adhere to each other to any appreciable extent. If it is found that the spheroidal particles do have a tendency to adhere to each other, such tendency may be readily overcome by dusting these particles with a very small amount of talc, flour or starch.

The pellets of this invention consist essentially of (a), (b) and (c) in the following amounts: the quantity of (a) is between about 1% and about 9% of the combined weight of (a), (b) and (c); and the quantity of (c) is not more than about 35% of the combined weights of (a), (b) and (c).

The addition of a water-insoluble wax or non-ionic surfactant will naturally decrease the percentage of (a) and (b) used; for example, the inclusion of 5–40% of water-insoluble wax or non-ionic surfactant necessitates the reduction of polyvinylpyrrolidone needed to 1–6% and of (b) from about 59–76% to about 19–59%.

The preferred embodiment of this invention for compositions containing a rapidly absorbed water-soluble pharmacologically active substance is one which consists essentially of about 3.5% polyvinylpyrrolidone, about 31.5% stearyl alcohol, about 40% candililla wax, and about 25% of the pharmacologically active material.

The following examples are illustrative, but by no means limitative, of the invention:

Example 1

(I) Polyvinylpyrrolidone (7 gm.) is dissolved in melted stearyl alcohol (63 gm.) by stirring at about 70° C. until solution results. The solution is then allowed to cool, with stirring, until it congeals. The congealed mass is cooled to room temperature, and then broken and passed through a No. 10 mesh screen and a No. 16 mesh screen.

(II) Candelilla wax (80 gm.) is melted by heating on a steam bath at approximately 80° C. To this is added the polyvinylpyrrolidone-stearyl alcohol mixture of (I) and the heat continued until a clear melt is obtained.

(III) The temperature is then allowed to drop to about 75° C., at which point 50 gm. of procaineamide hydrochloride [p-amino-N - (2 - diethylaminoethyl)benzamide hydrochloride] powder, micropulverized, is stirred into the molten mass. This mixture is stirred until a homogeneous dispersion of the procaineamide hydrochloride particles is effected.

(IV) The molten mixture is then allowed to cool to 68° C. and pelletized by slowly pouring the mixture into a previously heated hollow, revolving (approximately 1500 r.p.m.), inverted, perforated cone-shaped spindle sealed at the bottom end. The spindle, approximately 4 inches in length, 1–1½ inches in diameter (outer) at the top and approximately 2 inches in diameter (outer) at the bottom, is perforated with 27 drilled orifices interspaced around the bottom rim area. These openings are of two sizes, 3/64 and 1/16 inch in diameter, and are spaced alternately about ¼ inch apart. The spinning head is spun about 8 feet above the collecting area.

The small spherical beads formed from the molten mixture, when ejected from the spinning head, become hard and solid in their trajectory path through the air. The resultant product is then graded into sizes by screening, e.g. 14 to 20 mesh and 20 to 30 mesh.

(V) These beads (pellets) after being graded are then encapsulated by gravity fill methods in the conventional manner to give the desired dosage units.

Example 2

(I) Polyvinylpyrrolidone (13 gm.) is dissolved in melted stearyl alcohol (117 gm.) and then treated as in section (I) of Example 1.

(II) 20 gm. of a non-ionic surfactant consisting of a condensation product of ethylene oxide with a polypropylene glycol, the ethylene oxide portion being in the range of 80 to 90 molecule percent, and the polypropylene base having a molecular weight of 1501–1800 (e.g., Pluronic F-68, Wyandotte) is melted on a steam bath at approximately 80° C., added to (I) and the heat continued until a clear melt is obtained.

(III) The temperature is then allowed to drop to about 75° C. at which point 50 gm. of procaineamide hydrochloride powder, micropulverized, is stirred into the molten mass. This mixture is stirred until a homogeneous dispersion of the procaineamide hydrochloride particles is effected.

(IV) The molten mixture is then allowed to cool to 58° C. and pelletized as in section (IV) of Example I with a spindle speed of approximately 1300 r.p.m. being used in place of 1500 r.p.m. speed utilized in section (IV) of Example I.

(V) The pellets are then encapsulated as in section (V) of Example I.

Example 3

Polyvinylpyrrolidone (15 gm.) is dissolved in melted stearyl alcohol (135 gm.) and then treated as in section (I) of Example 1. The broken mass is heated until a clear melt is obtained; the temperature is then allowed to drop to about 75° C. at which point 50 gm. of micropulverized procaineamide powder is stirred into the molten mass. The mixture is continuously stirred until a homogeneous dispersion of the procaineamide hydrochloride particles is effected. The mixture is then treated as described in Example 2 sections (IV) and (V).

Example 4

(I) 14 gm. of polyvinylpyrrolidone is dissolved in melted stearyl alcohol (126 gm.) and then treated as in section (I) of Example 1.

(II) To 10 gm. of melted white beeswax, the polyvinylpyrrolidone-stearyl alcohol mixture of (I) is added and heat applied until a melt is obtained.

(III) The temperature is then allowed to drop to about 75° at which point 50 gm. of micropulverized procaineamide powder is stirred into the molten mass. The mixture is then stirred until a homogeneous dispersion of the procaineamide hydrochloride particles is effected.

(IV) The molten mixture is allowed to cool to 58° C. and then pelletized as in section (IV) of Example 1 and encapsulated as in section (V) of Example 1.

Example 5

(I) Polyvinylpyrrolidone (13 gm.) is dissolved in melted stearyl alcohol (117 gm.) and then treated as in section (I) of Example 1.

(II) To 20 gm. of a polyethylene glycol ether complex of high molecular weight fatty alcohols (e.g. Promulgen, Robinson-Wagner) is added the polyvinylpyrrolidone-stearyl alcohol mixture of (I) and heat applied until a melt is obtained.

(III) The temperature is then allowed to drop to about 75° C. at which point 50 gm. of micropulverized procaineamide powder is stirred into the molten mass. The mixture is then stirred until a homogeneous dispersion of the procaineamide hydrochloride particles is effected.

(IV) The molten mixture is allowed to cool to 58° C. and then pelletized as in section (IV) of Example 1 and then encapsulated.

Example 6

The procedure of Example 5 is followed substituting 20 gm. of a sterol type compound consisting of a fraction of lanolin alcohols containing approximately 28–32% of cholesterol (e.g. Ceralan, Robinson-Wagner) for the 20 gm. of the polyethylene glycol ether complex of high molecular weight fatty alcohols in section (II) of Example 5.

Other formulations may be prepared by the method of Example 5 by replacing the polyethylene glycol ether complex of high molecular weight fatty alcohols of part (II) with 20 gm. of any one of the following:

A symmetrical higher molecular weight aliphatic ketone derived from stearic acid (e.g. Stearone, Armour and Co.)

A glyceryl ester of a higher molecular weight fatty acid (e.g. glyceryl tri-stearate).

A higher molecular weight fatty acid (e.g. stearic acid).

With the preparations of this invention, it is possible to provide a timed release oral dosage form for pharmacologically active materials which obviates the inconvenience of administering therapeutic agents many times during a 24 hour period.

By use of the preparations of this invention and the resulting uniform body levels of medication obtained, a more efficient means of treating various conditions is obtained, inasmuch as the periods in which there is a deficiency of the therapeutic agent in the body is minimal.

The invention may be variously otherwise embodied within the scope of the appended claims.

What is claimed is:

1. A pharmaceutical preparation for oral administration essentially comprising a multiplicity of small pellets consisting essentially of the following components: (a) polyvinylpyrrolidone; (b) a substantially water-insoluble agent melting above 45° C., selected from the group consisting of saturated fatty acids, saturated fatty acid esters of mono, di and trihydric alcohols, mono and poly ethers of saturated fatty alcohols, saturated aliphatic ketones, and pharmacologically-acceptable sterols; and (c) a pharmacologically active material, said components being intimately combined with each other, the quantity by weight of the polyvinylpyrrolidone being between 1% and about 9% of the combined weights of (a), (b) and (c), and the quantity by weight of the pharmacologically active material being not more than about 35% of the combined weights of (a), (b) and (c).

2. The preparation defined by claim 1, in which the pellets are embodied in dosage unit form.

3. The preparation defined by claim 1, wherein component (b) is stearyl alcohol.

4. The preparation defined by claim 1, wherein component (b) is glyceryl tri-stearate.

5. The preparation defined by claim 1, wherein component (b) is stearic acid.

6. The preparation defined by claim 1, wherein component (b) is a symmetrical aliphatic ketone derived from stearic acid.

7. The method of preparing a pharmaceutical preparation essentially comprising a multiplicity of small pellets consisting essentially of the following components: (a) polyvinylpyrrolidone; (b) a substantially water-insoluble agent melting above 45° C. selected from the group consisting of saturated fatty acids, saturated fatty acid esters of mono, di and trihydric alcohols, mono and poly ethers of saturated fatty alcohols, saturated aliphatic ketones and pharmacologically-acceptable sterols; and (c) a pharmacologically active material, which essentially comprises the steps of forming (a), (b) and (c) into a substantially uniform molten mass, thereafter forming small fluid droplets from the molten mass and projecting the small droplets through the air until they are substantially solidified, forming pellets, substantially all of said pellets being passable through an 8 mesh screen and being retainable on a 200 mesh screen.

References Cited in the file of this patent

UNITED STATES PATENTS

| | | |
|---|---|---|
| Re. 24,090 | Diamond | Nov. 15, 1955 |
| 2,413,419 | Saunders | Dec. 31, 1946 |
| 2,738,303 | Blythe | Mar. 13, 1956 |
| 2,776,924 | Martin | Jan. 8, 1957 |
| 2,793,979 | Svedres | May 28, 1957 |

FOREIGN PATENTS

| | | |
|---|---|---|
| 285,091 | Great Britain | June 10, 1929 |